United States Patent
Parker, Jr. et al.

(10) Patent No.: US 9,074,921 B1
(45) Date of Patent: Jul. 7, 2015

(54) CRYOGENIC LIQUID LEVEL SENSOR APPARATUS AND METHOD

(71) Applicant: The United States of America as Represented by the Administrator of NASA, Washington, DC (US)

(72) Inventors: Allen R. Parker, Jr., Lancaster, CA (US); W. Lance Richards, Palmdale, CA (US); Anthony Piazza, Palmdale, CA (US); Hon Chan Man, Canyon County, CA (US); John A. Bakalyar, League City, TX (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 415 days.

(21) Appl. No.: 13/733,364

(22) Filed: Jan. 3, 2013

(51) Int. Cl.
*G01F 23/22* (2006.01)
*G01F 1/688* (2006.01)
*G01F 23/292* (2006.01)

(52) U.S. Cl.
CPC .............. *G01F 23/22* (2013.01); *G01F 1/6884* (2013.01); *G01F 23/292* (2013.01); *G01F 23/2921* (2013.01)

(58) Field of Classification Search
CPC . G01F 1/6884; G01F 23/292; G01F 23/2925; G01F 23/2927; G01F 23/22; G01K 11/32; G02B 6/02204
USPC .................. 73/290 R, 291–293, 295; 385/12
See application file for complete search history.

(56) References Cited

U.S. PATENT DOCUMENTS

| | | | |
|---|---|---|---|
| 6,072,922 A | 6/2000 | Albin et al. | |
| 7,349,600 B2 | 3/2008 | Chen | |
| 7,854,164 B2 | 12/2010 | Bosselmann et al. | |
| 2010/0284000 A1* | 11/2010 | Xu | ................. 356/301 |
| 2011/0280280 A1 | 11/2011 | Kochergin | |

OTHER PUBLICATIONS

Ye F, et al. "Cryogenic Fluid Level Sensors Multiplexed by Frequency-Shifted Interfermometry" Appl Opt. Oct. 10, 2010.
B.W. McMillen "Self-Powered Fiber Bragg Grating Sensors" 2008.
Tong Chen, et al. "Self-Heated All-Fiber Sensing System for Cryogenic Environments" Meas. Sci. Tech. 2010.
Shaorui Gao, et al. "All-optical fiber anemometer based on laser heated fiber Bragg gratings" Opt. Express 19, 10124-10130, 2011.
Xuewen Shu, et al. "Simultaneous Measurement of Liquid Level and Temperature Employing a Single Uniform FBG" Appl. Phy. Let. 86, 2005.
STTR Phas II "Active Fiber Optic Sensor Array for Cryogenic Fuel Monitoring and Management" Award No. 0956816 to Lake Shore Cryotronics, Inc.

* cited by examiner

*Primary Examiner* — Hezron E Williams
*Assistant Examiner* — David Z Huang
(74) *Attorney, Agent, or Firm* — Mark Homer

(57) ABSTRACT

The invention proposed herein is a system and method for measuring the liquid level in a container that employs an optic fiber sensor which is heated using a simple power source and a wire and making an anemometry measurement. The heater wire is cycled between two levels of heat and the liquid level is obtained by measuring the heat transfer characteristics of the surrounding environment.

15 Claims, 4 Drawing Sheets

CRYOGENIC LIQUID LEVEL SENSOR APPARATUS AND METHOD

STATEMENT OF GOVERNMENT INTEREST

The invention described herein may be manufactured and used by or for the Government of the United States of America for governmental purposes without payment of any royalties theron or therefor.

BACKGROUND OF THE INVENTION

1. Field of the Invention

The present invention relates in general to sensing liquid levels in containers holding cryogenic liquids. More specifically, the invention uses fiber optic sensors and anemometry to sense liquid levels in cryogenic liquid containers.

2. Description of the Related Art

Measuring liquid levels using temperature measurement techniques can be difficult to make, especially in cryogenic applications. In a closed system, when a cryogenic tank which is partial gas and partial liquid, pre-cooled and at steady state, the temperature difference between gas and liquid is very small, especially near the transition region between gas and liquid. Because of this decreasing temperature difference between the cryogenic liquid and the gas approaching the transition region, achieving high spatial resolution of the liquid level in a container becomes increasingly more challenging with temperature measurements alone.

The current method employed to measure cryogenic liquid levels in such a closed system container uses cryogenic diodes strategically placed serially along a rod/rack. These diodes have a high degree of precision and accuracy and are able to resolve temperatures of about 0.1 C. They are place along a rod at strategic points of interest to indicate whether liquid is present or not.

This approach works, however, the application is limited to the number of diodes able to be mounted onto a rod and, thus, the liquid level resolution is inherently poor. Also, because each diode has associated with it two wires, this makes installation of the device difficult and cumbersome; for example, to measure a 6 foot tall cryogen tank with 2 inch resolution, it would need 36 diodes lay into a rod, and placed into the cryogen tank. However, it would need at least 72 wires to support the multitudes of diodes being implemented, which would be very difficult to create a feed-out for the wires in the limited space ot the cryogen tank, considering also the instrumentation required to interrogate each individual diode sensor. Hence, with the cryogenic diode approach, the application is limited to preselected, sparely placed positions to measure liquid level and is cumbersome to install.

To overcome these problems it has been suggested to use fiber optic sensors to measure liquid levels in tanks. A patent to Chen, U.S. Pat. No. 7,349,600, discloses a fiber optic sensor that uses a special coating that is heated by in-fiber light to monitor liquid level in a container. To activate the special coating, a portion of the light leaks out of the core of the optical fiber and is absorbed by a thermal coating which radiates heat. The spectral response is different when the optic fiber sensor is submerged in liquid versus when the fiber optic sensor is pulled above the liquid level.

However, the inventors herein have found that simply heating the optical fiber sensor and taking the readings as suggested by the Chen patent does not provide sufficient resolution when the liquid temperature and gas temperature in the transition region of a liquid container is similar (such as in a cryogenic liquid tank). Also, using laser light and applying a thermal coating as suggested by the Chen patent can become expensive.

Therefore, it is desired to provide a system and method employing a fiber optic sensor to measure liquid levels in a container that is extremely accurate and inexpensive in the manufacturing of such specialized fiber.

SUMMARY OF THE INVENTION

The invention proposed herein comprises a system and method for measuring the liquid to level in a container that employs an optical fiber sensor which is heated using a simple power source and a wire and making an anemometry measurement. The heater wire is cycled between two levels of heat and the liquid level is obtained by measuring the heat transfer characteristics of the surrounding environment.

Accordingly, it is an object of this invention to provide a system and method for sensing the liquid level in a container using an optic fiber sensor.

It is a further object of this invention to provide a liquid level sensing system and method using an optic fiber with a plurality of Fiber Bragg grating (FBG) sensors.

It is yet a further object of this invention to provide an FBG optic fiber liquid level sensing system that employs the basic principles of anemometry to obtain high resolution liquid levels.

It is a still further object of this invention to provide an FBG optic fiber liquid level sensing system that employs anemometry through cycling on and off heat to the system to obtain high resolution liquid levels.

This invention meets these and other objectives related to cryogenic liquid level sensing by providing a device to sense the liquid in a container by providing a single-mode, continuous Bragg grating fiber, attached to a fiber optic interrogation system, that is heated using a heating wire in proximity to the fiber. These elements are placed within protective tubing in a bent or U-shape so that both ends of the tubing extend outside the top of the liquid container where the bent portion of the tubing is submerged in the liquid. A heating element controller is attached to the heating element and is directed to cycle heat on and off to the heating element. A control and display device is used to control the heater element controller and fiber optic interrogation system is used to measure and display the sensor results of the liquid level sensing system.

The invention also includes a method of sensing the liquid level in a container that employs the above noted device by cycling the heat provided to the optic via the heating element and using the fiber optic interrogation system to measure the heat transfer characteristics between the two heating levels at each Bragg grating location in order to determine the liquid level in the container.

BRIEF DESCRIPTION THE DRAWINGS

In the drawings, which are not necessarily to scale, like or corresponding parts are denoted by like or corresponding reference numerals.

DESCRIPTION OF PREFERRED EMBODIMENTS

Figure 1:
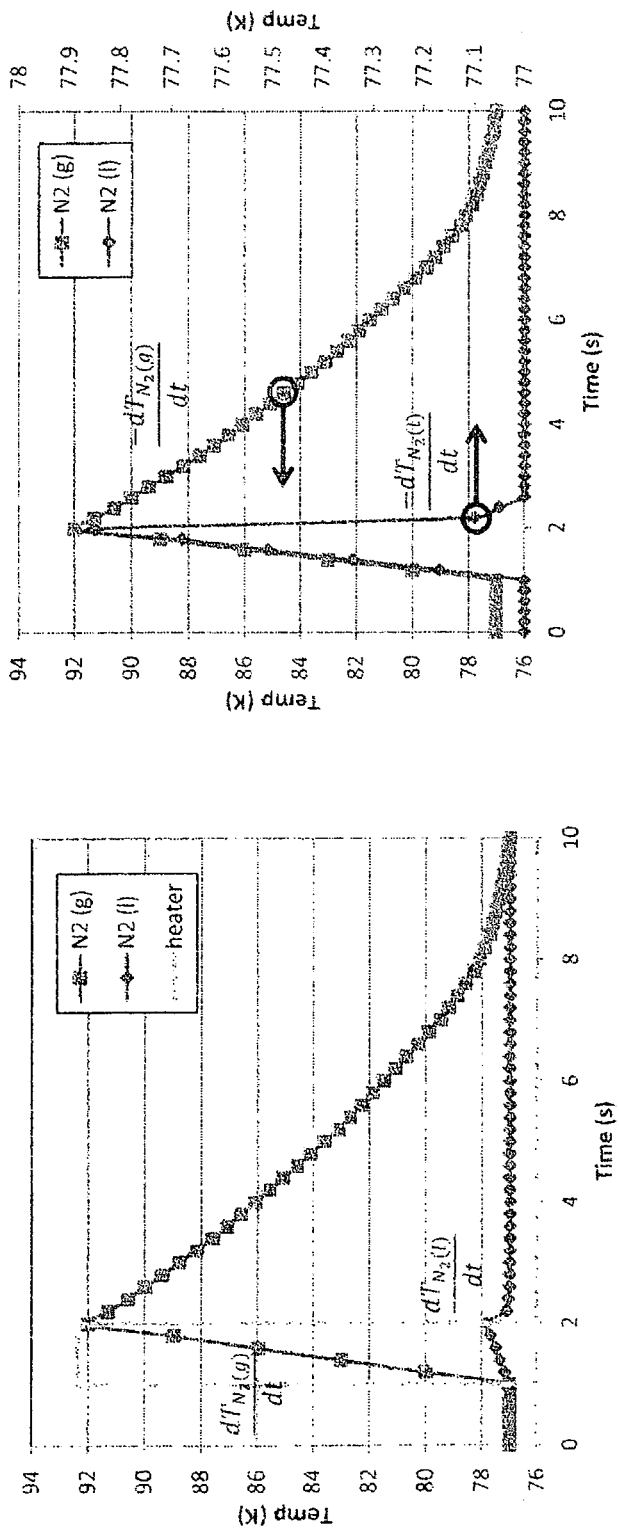
FIG. 1 depicts a graphical representation of the effect of heating and cooling change in liquid and gaseous nitrogen when heating for one or two seconds.

In applications where cryogenic fluids are used a method of discerning liquid level is important. Most of the sensing technologies on the market today use some form of switching to ascertain coarsely discrete levels of liquid. If multiple levels are needed, for instance 0%, 25%, 50%, 75%, and 100%, then multiple level sensing switches are needed with each having its own associated wiring. With the fiber optics technology serially multiplexed Bragg gratings are written continuously along a single mode fiber with lengths up to 40 ft long. With this technology a continuous liquid level measurement can be collected with unit length ¼" of less spatial resolution.

But using this technology to ascertain the temperature difference between the liquid/gas barrier can be very challenging within a cryogenic environment. For example, given a cryogenic fuel cell containing liquid nitrogen at a precooled, in steady state condition would contain a transition barrier region just above the liquid level that is within one degree Fahrenheit. In this case, using fiber Bragg gratings alone would not be adequate with our ability to only resolve +/−2° F., at best. By adding a heating wire with the fiber optic sensor to excite the local region around the fiber and by monitoring how the heat is absorbed by way of the fiber Bragg grating, a more accurate way of measuring liquid level is achieved.

While simply heating the fiber optic sensor region may provide some result, our testing has shown that large amounts of continuous power (>25%) was needed to invoke a notable ΔT at the transition interface between liquid and gaseous regions of a cryogenic liquid. The result of having a continuous heat source within the cryogenic liquid also caused continuous boiling, which caused a decrease in the liquid level as the liquid was being converted to gas. Therefore the sensor was adversely affecting the parameter of the liquid level that it was measuring.

Hence, it was determined that the boiling effects the heater wire had on the surrounding cryogenic liquid could be significantly reduced by power-cycling the heater wire, specifically by turning the power on at an appropriate power level to measure liquid level then off again to minimize liquid boil off rate. In addition, other benefits of this feature of the invention were observed.

As power transitioned from OFF to ON, a vast difference in heating rate occurred. between the gaseous state and the liquid state because of the difference between thermal conductivity of the cryogenic gas and cryogenic liquid. The heating rate of the gas region ($dT_G/dt$) was far greater than the heating rate of the liquid ($dT_L/dt$).

$$\frac{dT_{G,heating}}{dt} \gg \frac{dT_{L,heating}}{dt}$$

Because the gas region, for example, of gaseous nitrogen has a thermal conductivity of 0.0762 mW cm$^{-1}$ K$^{-1}$ while that of liquid nitrogen is 1.32 mW cm$^{-1}$ K$^{-1}$, the gas will absorb 18 times less heat than the liquid. This low thermal conductivity causes the resident area around the heater wire, namely the sensing fiber, to increase in temperature at a much higher rate than that of the liquid, when power is applied throughout the heating wire at both regions.

Similarly, when power is turned off from the heater wire the rate of change in temperature is notably different at the gas and liquid regions. During this power off state, residual heat from the previous ON state will be absorbed 18 times faster in the liquid than in the gas.

$$\frac{dT_{G,cooling}}{dt} \ll \frac{dT_{L,cooling}}{dt}$$

FIG. 1 illustrates the effect of heating and cooling change in liquid and gaseous nitrogen due to turning on a heater wire from 1 s to 2 s. The heating rate of gaseous nitrogen $$\left(\frac{dT_{N_{2(g)}}}{dt}\right)$$

is much higher than liquid nitrogen $$\left(\frac{dT_{N_{2(l)}}}{dt}\right).$$

Separate plotting of temperature between liquid and gaseous nitrogen is provided to better illustrate the rate of cooling. The cooling rate of liquid nitrogen $$\left(-\frac{dT_{N_{2(l)}}}{dt}\right)$$

is much faster than gaseous nitrogen $$\left(-\frac{dT_{N_{2(g)}}}{dt}\right).$$

Therefore by determining the rate of change during either or both the ON or OFF state at each grating, spaced every ¼" along the length of a fiber, liquid level can be ascertained. Also by using this ON/OFF cycling process, boil-off rate of cryogenic liquids as a result of the introduction of a level measuring device, can be minimized. In addition, a lower power level can be utilized if rate of change is being used as the indication of liquid level, further reducing cryogenic boil-off.

Since the cool-down rate of change is significantly faster in liquid than in gas, steady-state is reached earlier in the OFF portion of the process, thus yielding another indicator for liquid level. It is by observing the different cooling rate between different states approaching the final steady state of the liquid region, that provides the easiest method to determine liquid level of cryogenics and requires less numerical processing.

As such, the invention comprises the following elements. Referring to FIG. 1, the sensor 2 is made up of a single-mode, continuous Bragg grating fiber 4 in close proximity to a heating element 6. The fiber 4 and heating element 6 are placed in a protective tubing 8 which acts to provide physical protection for the fiber 4 and heating element 6 when they are placed in a container 10 containing a liquid 12. The protective tubing 8 is configured in a bent, U-shape such that the bottom portion of the protective tubing 8 is placed partially within the liquid 12 and the open ends of the tubing 8 extend out of the top of the container 10.

The fiber 4 extends from the top of the tubing 8 and is connected to a fiber optic interrogating system 14 which provides for interrogation of the fiber 4 via light propagation along the fiber 4 in order to determine strain measurements along the fiber 4.

The heating element 6 extends from both open ends at the top of the tubing 8 and is connected to a heating element controller 16. The heating element controller 16 provides power to heat the heating element 6 and is configured to cycle such power on and off as described further herein.

Finally, a control and display device 18 is used to control the fiber optic interrogation system 14 and heating element controller 16 and to display the liquid level sensing results of the system.

A single-mode, continuous Bragg grating fiber 4 as used herein is composed of cascading multiple fiber bragg gratings, written at the same center wavelength, onto a single fiber. It is desirable to place each physical grating to be as close as possible to one another without interfering the function of the sensor in order to create continuous Bragg gratings. To interrogate these sensors, methods such as optical frequency domain reflectometry (OFDR) as described in U.S. Pat. No. 6,506,649, which is incorporated by reference herein, can be utilized.

A preferred single-mode, continuous Bragg grating fiber 4 includes four sensors per inch of fiber and is approximately six feet in length. A most preferred fiber 4 is about 0.000145 inches in diameter at 1542 nm center wavelength. However, one skilled in the art may select different configurations of the fiber 4 depending upon the size or the container being measured and the resolution of liquid level sensing desired. One end of the fiber 4 is attached to the fiber optic interrogation system 14 and extends into one end of the tubing 8 at least to the bottom of the U-shape and may extend throughout the entire tubing 8.

The heating element 6 should be capable of providing the necessary heat to the fiber 4 in order to create the desired strain in the fiber 4 in order to make the liquid level sensing measurement as described further herein. It is preferred that the heating element 6 be of a size and shape so that it can be placed completely through the protective tubing 8 in close proximity to the fiber 4. Each end of the heating element 6 should extend from opposite ends of the tubing 8 and should both be attached to the heating element controller 16. A preferred embodiment of heating element 6 is a heating wire and a most preferred embodiment of the heating element 6 is a Cuprothal 49 heater wire (29 gauge or 0.011 inches in diameter).

The protective tubing 8 should be sized so that it can be placed within the liquid 12 within the liquid container 10 and the open ends of the protective tubing 8 can extend beyond the top of the container 10. A preferred diameter of the protective tubing is about 0.035 inches in diameter so that the fiber 4 and heating element 6 may be placed therein and still be within proximity of one another; however, this size can be modified by one skilled in the art depending upon the sizes of fiber 4 and heating element 6 employed as well as the type of material of tubing 8.

The protective tubing 8 should be constructed of a material that protects the physical integrity of the fiber 4 and heating element 6 when the tubing 8 is placed within the container 10 as described herein. A preferred material for the protective tubing 8 is polytetrafluoroethylene, but many polymer based materials may be used.

The fiber optic interrogating system 14 should be capable of interrogating the fiber 4 and providing strain/temperature data. Such a system 14 normally includes a linearly swept, mode hop free C-band tunable laser, an optical multi-channel network, optical to electrical amplifier circuit, analog to digital converter interface and a processing engine; for example, that set forth in U.S. Pat. No. 6,566,648.

The heating element controller 16 should provide power sufficient to heat the heating element 6 so that the fiber 4 displays sufficient strain in order to make the liquid level measurements as described further herein. The heating element controller 16 preferably is capable of providing from 0 to 120 V of AC that sources up to 3 A to the heating element 6. In a most preferred embodiment, the heating element controller 16 is a USB controlled AC current delivery unit, based on phase angle control that is capable of interrupting power as described further herein.

The control and display device 18 sends commands to the fiber optic interrogation system 14 and heating element controller 16, preferably via software, monitors the other elements of the invention, and displays information regarding these elements and commands to the user of the invention. In a preferred embodiment, the control and display device is a portable computer that is equipped with software that interfaces directly with the fiber optic interrogation system 14 and heating element controller 16. The control and display device 18 is preferably connected to the fiber optic interrogation system 14 through a Gigabit Ethernet port and is connected to the heating element controller via a USB connection.

The control and display device 18 provides command and control of these elements that allow for the heating element controller to cycle power on and off as described farther herein to the heating element 6 and for the fiber optic interrogation system to interrogate the Bragg grating sensors of the fiber 4 at the appropriate time intervals associated with heating the fiber 4 as described herein.

Figure 2:
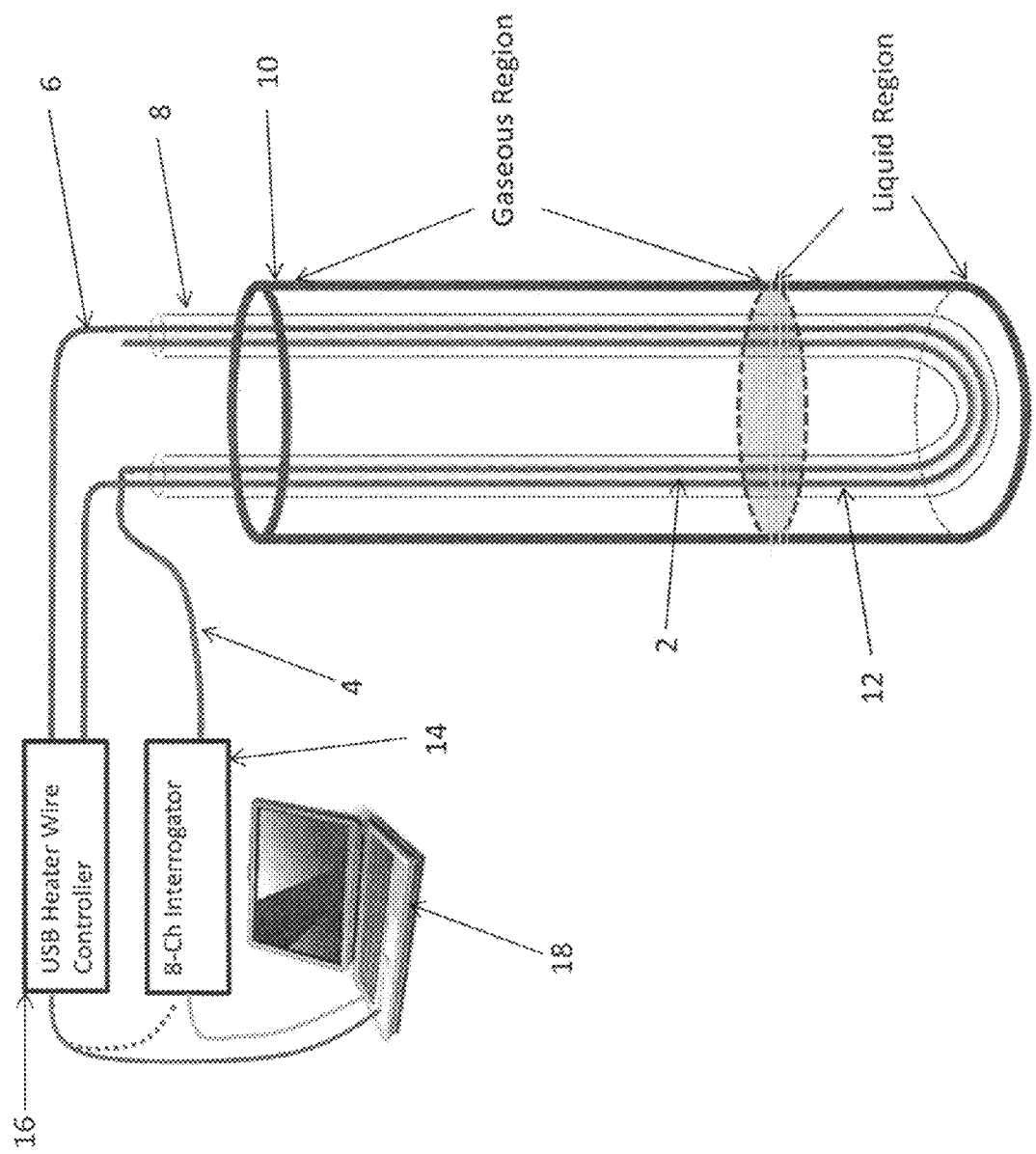
FIG. 2 depicts the general elements of an embodiment of the invention.
Figure 3:
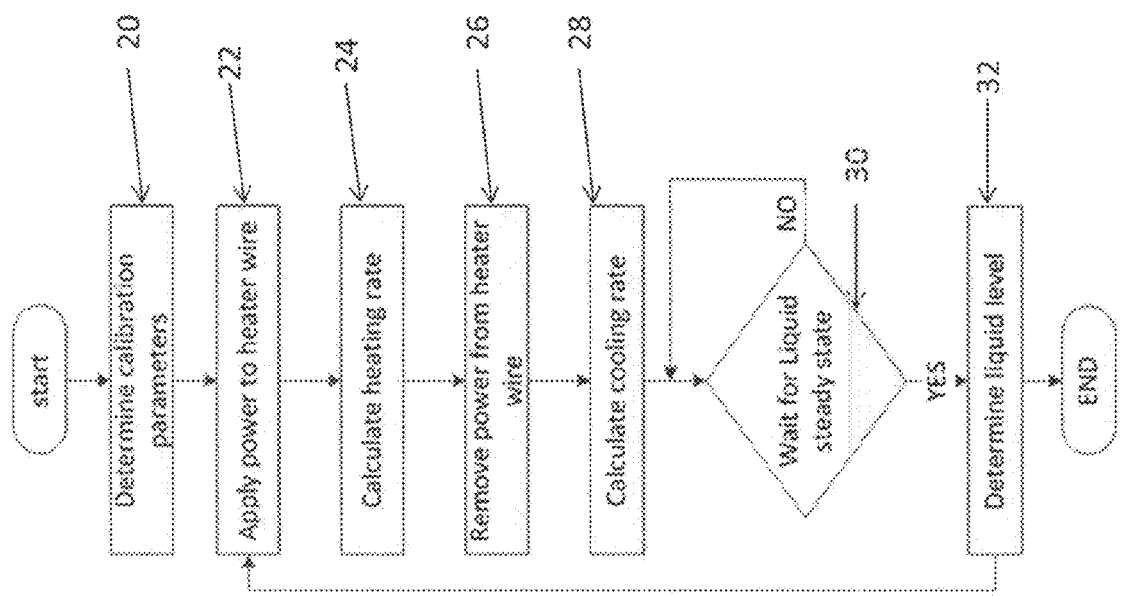
FIG. 3 depicts a flow of an embodiment of a process of the invention.
Figure 4:
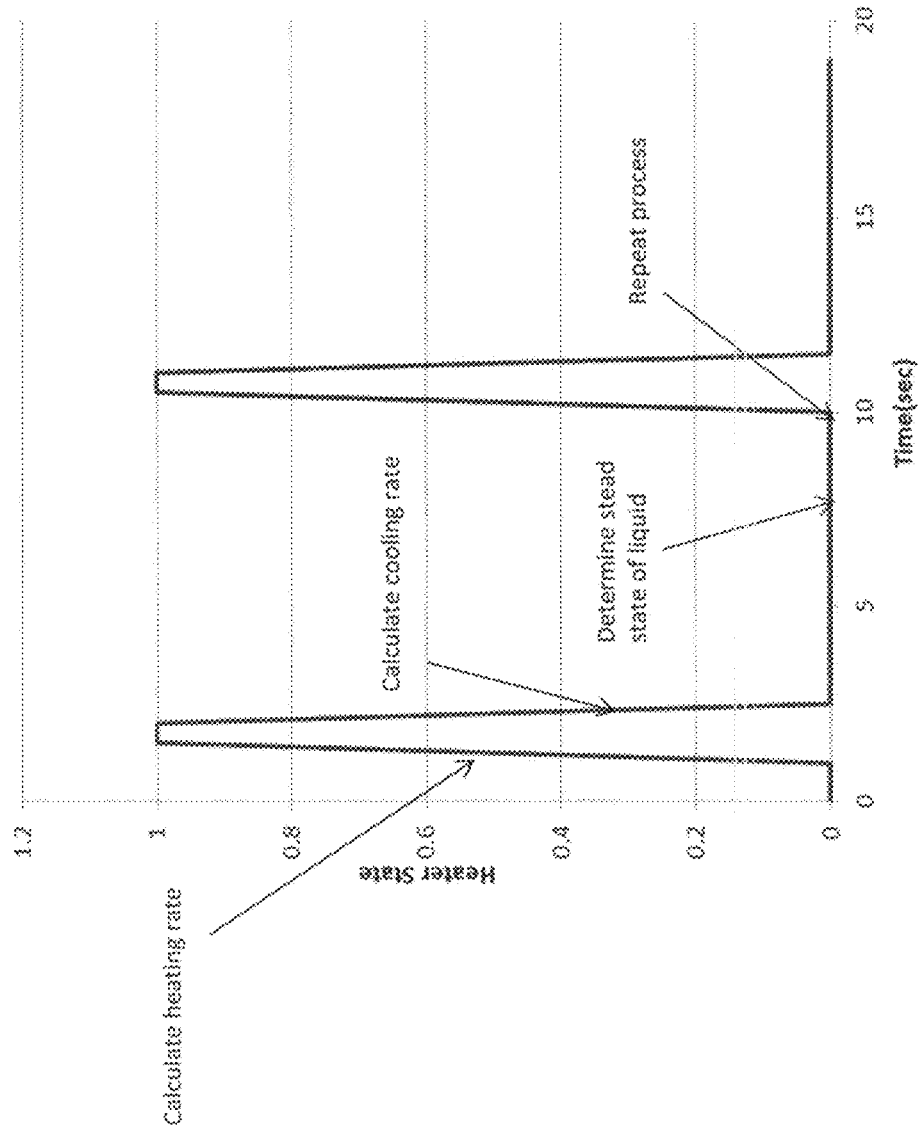
FIG. 4 depicts a chart showing the heater state versus time for the process depicted in FIG. 3.

Referring to FIGS. 2 and 3, the following describes the process of liquid level sensing using the above noted elements.

The first step of the process 20 is to determine the specific parameters to be used related to the amount of power provided to the heating element 6 and time profile associated with said heating.

As noted above, the general process associated with the invention includes cycling the power from the heating controller element 16 on and off. Thus, the first step includes ascertaining the appropriate power level associated with cycling the power on.

To determine the ON-state power level adequate for making a valid liquid level measurement, a simple calibration process of ramping up the power level to the heating element 6 is applied. This ramp process is continued until a notable increase in strain output of the fiber Bragg gratings (approx. by 100 $\mu\epsilon$) of the fiber 4 in the known liquid region.

For example, with liquid nitrogen (LN2) an ON-state power level of 15% of a 120 V AC heating element controller 16 delivering 0.6 A was determined the minimum threshold to achieve a notable increase in strain output of the liquid region 12 indicated by the fiber 4. A range of power levels were tested from 0% to 30%, with the ability to adequately measure liquid between 15% to 30% beyond which the risk of overheating the portion of the system not found inside the cryogenic environment in addition to the excessive boil-off of the liquid cryogen.

Once a notable change has been observed, the power level to the heating element 6 can be returned to 0% (OFF-state).

This process of determining an adequate power level for the heating element 6 need only to be performed once for each setup.

Once the correct power level is identified, the timing profile for a complete measurement cycle can be determined. From a steady-state condition, the identified power level is applied to the heating element 6 and the time measured from initial application of power to a notable increase in the liquid region equates to the ON-state profile time. With the power return to 0%, the time it takes for the liquid region, indicated by the fiber optic output, to return to steady-state determines the OFF-state profile time.

Again, for the LN2 example, an ON-state time of 0.8 seconds followed by a 7 second OFF-state profile time was determined (see FIG. 3). Longer exposure of the ON-state does not yield better measurements, only excessive boil-off and longer measurement cycles. Extended time beyond the steady-state of the liquid region, likewise does not yield better results but adversely allows for the gaseous region to also reach steady-state making the measurement beyond the OFF-state profile time unnecessary. If repeated measurements are desired, it is advantageous to repeat the measurement process immediately following the adequate OFF-state profile time to prevent this from occurring. The power level and time interval calibration is dependent upon the type of liquid, as well as the power supply maximum power output and will, therefore, vary; however, one skilled in the art may determine these variables using the process set forth herein.

The second step of the process 22 is to apply the calibrated power level via the heating element controller 16 to the heating element 6, which, in turn, heats the fiber 4 for the calibrated time period.

The next step of the process 24 is to use the fiber optic interrogation system to calculate the heating rate by evaluating the strain associated with the fiber at all of the Bragg grating locations along the fiber 4.

Once this is accomplished, the next step 26 is to cycle the power to the heating element 6 off.

The next step of the process 28 is to calculate the cooling rate in the same manner as calculating the heating rate until the liquid region 12 reaches a steady state 30.

The final step 32 is to take the data obtained from the heating rate calculation and the cooling rate calculation at steady state and use this data to determine the liquid level 12 in the container 10. The heating rate is the change of temperature over the change in time, represented by $\Delta T/\Delta t$, and the cooling rate is the same calculation, but with a negative slope, where it is represented by $-\Delta T/\Delta t$. To calculate the heating/cooling rate, a set turn-on/turn-off time is programmed into the heater, and the temperature change of the liquid is proportional to the strain change the sensors observed. After a few cyclic run under steady state, a reliable heating and cooling rate can be observed for both gaseous state and liquid state of the cryogen. By observing the change of cooling rate at any particular location, within ¼ inch, of the fiber, one can determine the liquid/gaseous interface of the cryogen, thus determining the liquid level.

As noted above, if desired, this process can be repeated at any interval desired by the user to closely monitor the liquid level in a container. In addition, it is certainly possible to get a liquid level estimate using the data obtain during the cooling rate as described above.

What is described are specific examples of many possible variations on the same invention and are not intended in a limiting sense. The claimed inventor can be practiced using other variations not specifically described above.

What is claimed is:

1. A system for sensing liquid level in a container partially filled with liquid, comprising:
    a protective tubing in a bent shape so that both ends of the tubing extend outside a top of the container and a bent portion of the tubing is submerged in the liquid;
    a single-mode, continuous Bragg grating fiber placed within the protective tubing, having at least one end attached to a fiber optic interrogating system, and extending at least to a bottom of the bent portion of the tubing;
    a heating element placed within the protective tubing capable of heating the continuous Bragg grating fiber;
    a heating element controller, attached to the heating element that cycles heat on and off to the heating element; and,
    a control and display device to control the heater wire controller and fiber optic interrogation system and display the results of the liquid level sensing system.

2. The system for sensing liquid level of claim 1, wherein the liquid comprises a cryogenic fluid.

3. The system for sensing liquid level of claim 2, wherein the protective tubing comprises a polytetrafluoroethylene material having a 0.035 inch diameter.

4. The system for sensing liquid level of claim 2, wherein the heating element comprises a Cuprothal 49 heater wire.

5. The system for sensing liquid level of claim 2, wherein the heating element controller comprises a source of up to 3 amperes at 0 to 120 V AC.

6. The system for sensing liquid level of claim 5, wherein the healing element controller cycles on up to 30 percent power for a time period and cycles off at 0 percent power until a steady state is reached.

7. The system for sensing liquid level of claim 6, wherein the time period comprises less than about 10 seconds.

8. The system for sensing liquid level of claim 7, wherein the heating element controller comprises a USB controlled AC delivery unit.

9. A process for sensing the liquid level in a container partially filled with liquid, comprising the steps of:
    inserting a bent shaped protective tubing into the liquid so that the ends of the tubing extend beyond a top of the container;
    inserting a single-mode, continuous Bragg grating fiber within the tubing and attaching at least one end of the Bragg grating fiber to a fiber optic interrogation system;
    inserting a heating element within the tube and attaching the heating element to a heating element controller;
    providing power to the heating element controller to heat the heating element for a period of time:
    interrogating the continuous Bragg grating fiber to measure the heat transfer characteristics surrounding each Bragg grating;
    cutting power to the heating element controller to stop heating the heating element until a steady state of a liquid region in the container is reached;
    interrogating the continuous Bragg grating fiber to measure the heat transfer characteristics around each Bragg grating: and,
    determining the liquid level in the container from the differential between interrogating steps.

10. The process for sensing liquid level of claim 9, wherein the liquid comprises a cryogenic fluid.

11. The process for sensing liquid level of claim 10, wherein the period comprises less than about 10 seconds.

12. The process for sensing liquid level of claim 11, wherein the heating element controller comprises a source of up to 3 amperes at 0 to 120 VAC.

13. The process for sensing liquid level of claim 12, wherein the power comprises up to 30 percent of a maximum from the heating element controller.

14. The process for sensing liquid level of claim 13, wherein the heating element comprises a heating wire.

15. The process for sensing liquid level of claim 10, including the step of calibrating the amount of power supplied by the heating element controller based upon the type of cryogenic fluid.

* * * * *